J. L. POLAND.
AUTOMOBILE LOCK.
APPLICATION FILED MAR. 4, 1919.
1,305,563.
Patented June 3, 1919.
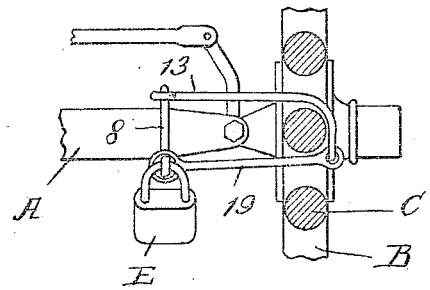
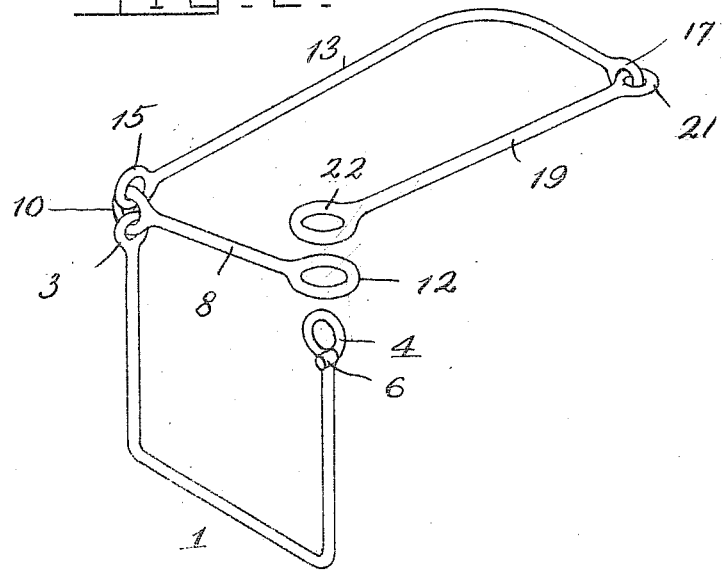
WITNESS:
L. J. Fischer
INVENTOR.
John L. Poland
BY
F. G. Fischer,
ATTORNEY.

UNITED STATES PATENT OFFICE.

JOHN L. POLAND, OF CHETOPA, KANSAS.

AUTOMOBILE-LOCK.

1,305,563. Specification of Letters Patent. Patented June 3, 1919.

Application filed March 4, 1919. Serial No. 280,573.

*To all whom it may concern:*

Be it known that I, JOHN L. POLAND, a citizen of the United States, residing at Chetopa, in the county of Labette and State of Kansas, have invented certain new and useful Improvements in Automobile-Locks, of which the following is a specification.

This invention relates to automobile locks, and my objects are to provide a simple, inexpensive and efficient device of this character for engagement with the axle and one or more of the spokes of an automobile to prevent theft or unauthorized use thereof.

A preferred embodiment of the invention is disclosed by the accompanying drawing, in which:

Figure 1 is a broken plan view, partly in section, of the axle and a front wheel of an automobile with the device in position thereon.

Fig. 2 is a detail, perspective view of the device.

A and B designate the front axle and one of the front wheels, respectively, of an automobile.

1 designates a U-shaped axle-engaging member adapted to fit beneath and around the front and rear sides of the axle A. Said U-shaped member 1 is provided at its ends with eyes 3 and 4 and a stop 6 adjacent the eye 4.

8 designates a transverse member provided at its terminals with eyes 10 and 12, the former being loosely secured to the eye 3 and the latter being adapted to pass freely over the eye 4 and rest upon the stop 6.

13 designates a spoke-engaging member provided at its ends with eyes 15 and 17, the former of which is loosely secured to the eye 10. The free end of the member 13 is bent, substantially, at right angles to the main portion thereof and its eye 17 loosely engages the eye 21 at one end of a retaining member 19, the opposite end of which has an eye 22 adapted to pass freely over the eye 4 and rest upon the eye 12.

In practice the spoke-engaging member 13 is slipped into position relative to one of the spokes C, as disclosed on Fig. 1, and the U-shaped member 1 is slipped into position upon the axle A, after which the eyes 12 and 22 are passed downwardly over the eye 4 and secured by suitable means, such as a padlock E, the hasp of which passes through the upper portion of the eye 4 and over the eye 22.

When the device is thus secured in position it is obvious that the front wheel B of the automobile is reliably secured against rotation and that said automobile cannot be operated until the device is removed.

While I have shown and described the preferred form of my invention, I reserve the right to make such changes in the construction, combination, and arrangement of parts, as properly fall within the spirit and scope of the claims.

Having thus described my invention, what I claim and desire to secure by Letters Patent, is:

1. A device of the character described, consisting of a U-shaped member adapted to fit upon an automobile axle, a transverse member operably-secured to said U-shaped member to secure the same to the axle, a spoke-engaging member operably-secured at one end to said transverse member, a retaining member operably-secured to the free end of said spoke-engaging member and engaging one end of the U-shaped member, and means to lock the respective members in active position.

2. A device of the character described, consisting of a U-shaped member adapted to fit upon an automobile axle and provided at its ends with eyes, a transverse member operably-secured at one end to one of said eyes and removably engaging the opposite eye, a spoke-engaging member having eyes at its terminals and one of which is operably-secured to the transverse member, a retaining-member having eyes at its terminals, one of which is operably-secured to the eye at the free end of said spoke-engaging member, the other eye being adapted to removably engage an eye of the U-shaped member, and means to lock the removable eyes of the respective members in active position.

In testimony whereof I affix my signature, in the presence of two witnesses.

JOHN L. POLAND.

Witnesses:
  A. R. BELL,
  S. W. KELLY.